United States Patent
Nixon

(10) Patent No.: US 10,991,253 B2
(45) Date of Patent: Apr. 27, 2021

(54) SYSTEMS AND METHODS FOR AUTONOMOUS MOBILE FOOD PREPARATION AND DELIVERY

(71) Applicant: Timothy James Nixon, Washington, MI (US)

(72) Inventor: Timothy James Nixon, Washington, MI (US)

(*) Notice: Subject to any disclaimer, the term of this patent is extended or adjusted under 35 U.S.C. 154(b) by 0 days.

(21) Appl. No.: 15/586,458

(22) Filed: May 4, 2017

(65) Prior Publication Data

US 2018/0321679 A1 Nov. 8, 2018

(51) Int. Cl.
G08G 1/00 (2006.01)
G06Q 10/08 (2012.01)
B60P 3/025 (2006.01)

(52) U.S. Cl.
CPC ............ *G08G 1/202* (2013.01); *G06Q 10/08* (2013.01); *G06Q 10/083* (2013.01); *B60P 3/0257* (2013.01)

(58) Field of Classification Search
CPC .................................................. G08G 1/202
USPC .......................................................... 701/27
See application file for complete search history.

(56) References Cited

U.S. PATENT DOCUMENTS

| 7,103,460 | B1* | 9/2006 | Breed | B60C 23/0408 |
| | | | | 701/29.1 |
| 9,392,743 | B2* | 7/2016 | Camacho-Cook | A01C 7/06 |
| 9,836,117 | B2* | 12/2017 | Shapira | G06F 3/011 |
| 9,841,494 | B2* | 12/2017 | Meadow | G01S 5/0036 |
| 9,898,638 | B2* | 2/2018 | Jones | G06K 7/1417 |
| 9,904,900 | B2* | 2/2018 | Cao | G06Q 10/083 |
| 10,538,190 | B1* | 1/2020 | Metellus | G08G 9/00 |
| 2002/0048624 | A1* | 4/2002 | Blanchet | A21D 13/41 |
| | | | | 426/391 |
| 2004/0023087 | A1* | 2/2004 | Redmond | C01B 3/0031 |
| | | | | 429/515 |
| 2005/0192727 | A1* | 9/2005 | Shostak | B60C 23/041 |
| | | | | 701/37 |
| 2006/0025897 | A1* | 2/2006 | Shostak | G08G 1/017 |
| | | | | 701/1 |
| 2006/0170508 | A1* | 8/2006 | Tanaka | H03B 5/18 |
| | | | | 331/154 |
| 2014/0370167 | A1* | 12/2014 | Garden | B60P 3/007 |
| | | | | 426/233 |

(Continued)

FOREIGN PATENT DOCUMENTS

CN 102328791 A 5/2011
FR 3036685 A1 * 2/2016

(Continued)

OTHER PUBLICATIONS

Google translation of FR 3036685 A1 (Jun. 7, 2018).*

(Continued)

*Primary Examiner* — Jean Paul Cass
(74) *Attorney, Agent, or Firm* — Buckert Patent & Trademark Law Firm PC; John F. Buckert

(57) ABSTRACT

Methods and systems are provided for delivering food. In one embodiment, a method includes: receiving, by a processor, a food delivery request; autonomously preparing food, by the processor and at least one robot or task specific device, based on the food delivery request in a compartment configured to be sterile of an autonomous vehicle; and autonomously delivering the prepared food by the autonomous vehicle.

14 Claims, 8 Drawing Sheets

(56) References Cited

U.S. PATENT DOCUMENTS

| | | | |
|---|---|---|---|
| 2015/0006005 A1* | 1/2015 | Yu | G06Q 50/28 701/22 |
| 2016/0148181 A1* | 5/2016 | Prosperie, III | G07F 13/025 705/16 |
| 2016/0162833 A1 | 6/2016 | Garden | |
| 2016/0195602 A1* | 7/2016 | Meadow | G01S 5/10 701/517 |
| 2016/0364678 A1* | 12/2016 | Cao | G06Q 50/30 |
| 2016/0364679 A1* | 12/2016 | Cao | G06Q 50/30 |
| 2016/0364812 A1* | 12/2016 | Cao | G06Q 50/30 |
| 2016/0364823 A1* | 12/2016 | Cao | G06Q 50/30 |
| 2017/0174343 A1* | 6/2017 | Erickson | A61B 5/4815 |
| 2017/0213062 A1* | 7/2017 | Jones | G06K 9/0063 |
| 2017/0220978 A1* | 8/2017 | Vaananen | B64C 39/024 |
| 2017/0220979 A1* | 8/2017 | Vaananen | G06Q 10/083 |
| 2017/0228692 A1* | 8/2017 | Pargoe | B65D 43/16 |
| 2017/0267347 A1* | 9/2017 | Rinaldi | B64D 17/80 |
| 2017/0267348 A1* | 9/2017 | Sweeny | A47J 47/14 |
| 2017/0290345 A1* | 10/2017 | Garden | A21B 7/00 |
| 2017/0323496 A1* | 11/2017 | Baker | G07C 5/0825 |
| 2017/0337813 A1* | 11/2017 | Taylor | G05D 1/0287 |
| 2017/0363079 A1* | 12/2017 | Baker | E21B 47/009 |
| 2018/0040162 A1* | 2/2018 | Donnelly | G05D 1/0246 |
| 2018/0040163 A1* | 2/2018 | Donnelly | G06F 3/017 |
| 2018/0052218 A1* | 2/2018 | Meadow | H04W 4/021 |
| 2018/0096175 A1* | 4/2018 | Schmeling | B29C 64/10 |
| 2018/0158153 A1* | 6/2018 | Ekin | G06Q 10/06315 |
| 2018/0225734 A1* | 8/2018 | Towal | G06Q 30/0621 |
| 2018/0232689 A1* | 8/2018 | Minvielle | G06N 5/003 |
| 2019/0050952 A1* | 2/2019 | Goldberg | G05D 1/0276 |
| 2019/0286162 A1* | 9/2019 | Fischer | G08G 1/22 |

FOREIGN PATENT DOCUMENTS

| | | |
|---|---|---|
| PT | 104113 B | 6/2009 |
| PT | 1404113 B | 6/2009 |

OTHER PUBLICATIONS

International Search Report and Written Opinion for PCT/US18/30293 dated Jul. 23, 2018.
Supplementary European Search Report, dated Sep. 21, 2020; 9 pages.

* cited by examiner

SYSTEMS AND METHODS FOR AUTONOMOUS MOBILE FOOD PREPARATION AND DELIVERY

TECHNICAL FIELD

The technical field generally relates to autonomous vehicles, and more particularly relates to methods and systems for providing movable food by way of an autonomous vehicle.

BACKGROUND

Personal food delivery services typically prepare food and/or drinks in a kitchen environment, package the food and/or drinks for transportation, and personally drive the packaged food and/or drinks to the requesting address. Each stage of the food delivery service potentially exposes the food and/or drinks to many people and the environment. In such systems, prior to acceptance by the user, the food and/or drink is exposed to many potential contaminants.

An autonomous vehicle is a vehicle that is capable of sensing its environment and navigating with little or no user input. An autonomous vehicle senses its environment using sensing devices such as radar, lidar, image sensors, etc. The autonomous vehicle system further uses information from global positioning systems (GPS) technology, navigation systems, and/or drive-by-wire systems to navigate the vehicle.

Autonomous vehicles are typically used to carry passengers from point A to point B. It is desirable to make use of the autonomous vehicle to transport the food and/or drinks to a requesting location to prevent exposure to the many potential contaminants. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for delivering food. In one embodiment, a method includes: receiving, by a processor, a food delivery request; autonomously preparing food, by the processor and at least one robot or task specific device, based on the food delivery request in a compartment configured to be sterile of an autonomous vehicle; and autonomously delivering the prepared food by the autonomous vehicle.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. As used herein the term autonomous refers to without or substantially without human input.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of transportation control systems, and that the vehicle system described herein is merely one example embodiment of the invention.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
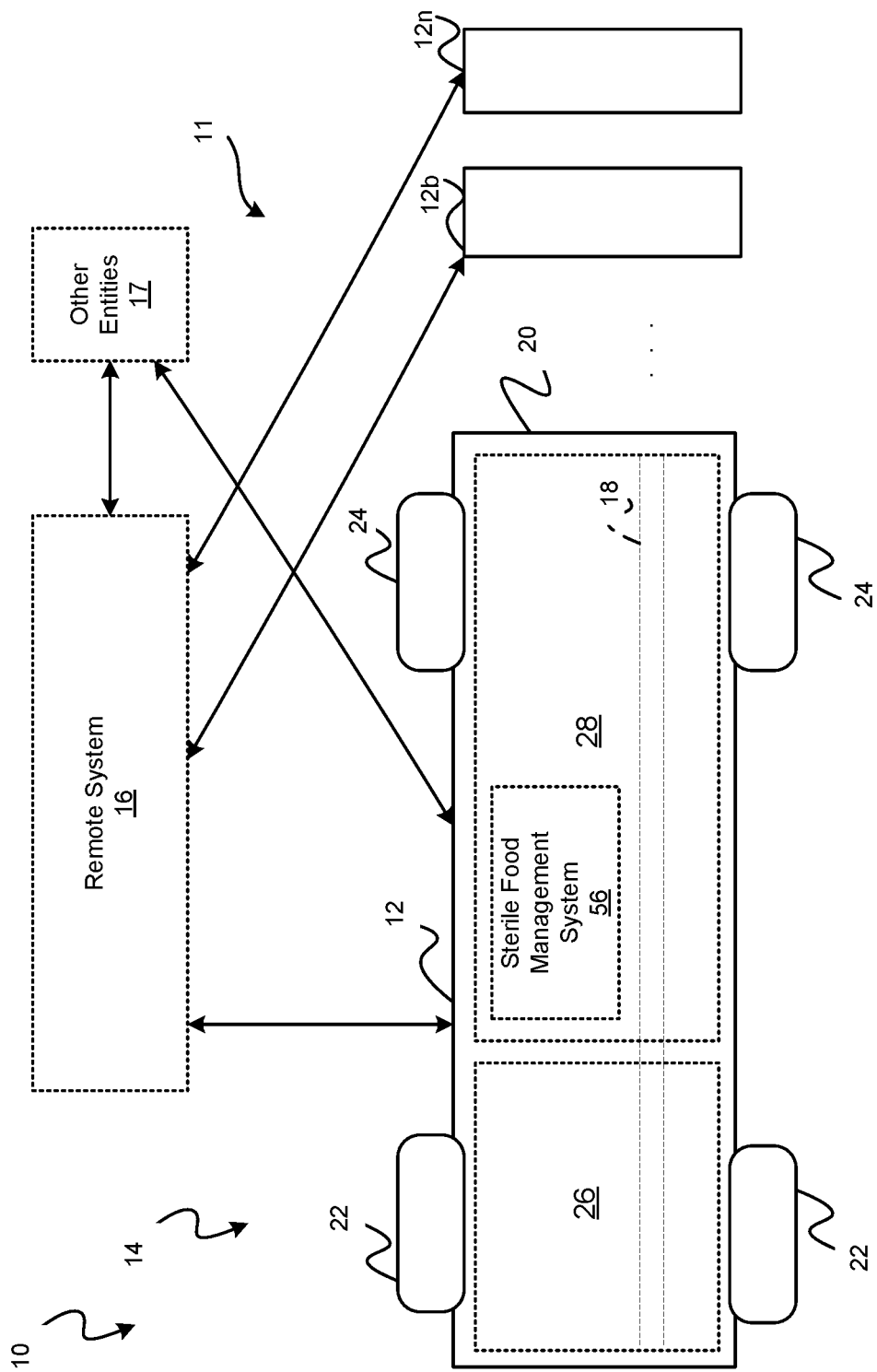
FIG. 1 is a functional block diagram of an autonomous vehicle including a mobile food preparation and delivery system in accordance with various embodiments.

With initial reference to FIG. 1, a transportation system 10 that manages a fleet 11 of one or more vehicles 12-12n is shown to be associated with a mobile food preparation and delivery system 14 in accordance with various embodiments. The transportation system 10 can reside on a remote system 16, on the vehicle 12, or partially on the remote system 16 and partially on the vehicles 12-12n (as shown as discussed herein). The fleet 11 of one more vehicles 12-12n can include autonomous vehicles, semi-autonomous vehicles, non-autonomous vehicles, or any combination thereof. For exemplary purposes, the disclosure will be discussed in the context of the fleet 11 including one or more autonomous vehicles hereinafter referred to as autonomous vehicle 12. Although a single vehicle 12 is illustrated in FIG. 1 in detail, for clarity, it is understood that the fleet 11 can include more than a single vehicle 12 having the same or similar components.

In accordance with a typical use case workflow, a registered user of the mobile food preparation and delivery system 14 can create a delivery request via a personal device (such as a cell phone) or other device 17. The delivery request will typically indicate the user's desired food or drink, a desired delivery location (or current GPS location), a desired delivery time, and any special instructions. The remote system 16 receives the delivery request, processes the request, and dispatches a selected one of the autonomous vehicles 12-12n (when and if one is available) of the fleet 11 to prepare and delivery the requested food or drink at the designated location and at the appropriate time. The remote system 16 can also generate and send a suitably configured confirmation message or notification to the user device, to let the passenger know that a vehicle is on the way. Once dispatched, the autonomous vehicle 12 autonomously drives to the location at the requested time while preparing the requested food or drink in a sterile environment and in an autonomous manner.

As shown in FIG. 1, the autonomous vehicle 12 of the fleet 11 includes, among other features, a chassis shown in phantom at 18, a body 20, front wheels 22, and rear wheels 24. The body 20 is arranged on the chassis 18 and substantially encloses components of the vehicle 12. The body 20 and the chassis 18 may jointly form a frame. The wheels 22-24 are each rotationally coupled to the chassis 18 near a respective corner of the body 20. The body 20 and the chassis 18 are designed such that the vehicle 12 is divided into at least two compartments, a first compartment 26 and a second compartment 28.

The first compartment 26, hereinafter referred to as the vehicle operation compartment 26, is shown in more detail in FIG. 2A and generally includes a propulsion system 30, a transmission system 32, a braking system 34, a steering system 36, a sensor system 38, an actuator system 40, and a controller system 42. The propulsion system 30 may, in various embodiments, include an internal combustion engine, an electric machine such as a traction motor, and/or a fuel cell propulsion system. The transmission system 32 is configured to transmit power from the propulsion system 30 to the vehicle wheels 22-24 (FIG. 1) according to selectable speed ratios. The braking system 34 is configured to provide braking torque to the vehicle wheels 22-24. The braking system 34 may, in various embodiments, include friction brakes, brake by wire, a regenerative braking system such as an electric machine, and/or other appropriate braking systems. The steering system 36 influences a position of the of the vehicle wheels 22-24.

The sensor system 38 includes one or more sensing devices 43a-43n that sense observable conditions of the exterior environment and/or of the interior environment of the autonomous vehicle 12 (FIG. 1). The sensing devices 43a-43n can include, but are not limited to, radars, lidars, global positioning systems, optical cameras, thermal cameras, ultrasonic sensors, internal measurement units, and/or other sensors that provide data for use in the control and navigation of the autonomous vehicle 12 (FIG. 1).

The actuator system 40 includes one or more actuator devices 45a-45n that control one or more vehicle features such as, but not limited to, the propulsion system 30, the transmission system 32, the steering system 36, and the braking system 34.

The controller system 42 includes at least one controller 44. The controller 44 includes at least one processor 46 and a computer readable storage device or media 48. The processor 46 can be any custom made or commercially available processor, a central processing unit (CPU), a graphics processing unit (GPU), an auxiliary processor among several processors associated with the controller 44, a semiconductor based microprocessor (in the form of a microchip or chip set), a macroprocessor, any combination thereof, or generally any device for executing instructions. The computer readable storage device or media 48 may include volatile and nonvolatile storage in read-only memory (ROM), random-access memory (RAM), and keep-alive memory (KAM), for example. The computer-readable storage device or media 48 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 44 in controlling the autonomous vehicle 12 (FIG. 1).

The instructions may include one or more separate programs, each of which comprises an ordered listing of executable instructions for implementing logical functions. The instructions, when executed by the processor 46, receive and process signals from the sensor system 38, perform logic, calculations, methods and/or algorithms for automatically controlling the components of the autonomous vehicle 12 (FIG. 1), and generate control signals to the actuator system 40 to automatically control the components of the autonomous vehicle 12 (FIG. 1) based on the logic, calculations, methods, and/or algorithms. Although only one controller 44 is shown in FIG. 2A, embodiments of the autonomous vehicle 12 (FIG. 1) can include any number of controllers 44 that communicate over any suitable communication medium or a combination of communication mediums and that cooperate to process the sensor signals, perform logic, calculations, methods, and/or algorithms, and generate control signals to automatically control features of the autonomous vehicle 12 (FIG. 1).

The controller system 42 may further include a data storage device 50 and/or a communication system 52. The data storage device 50 stores data for use in automatically controlling the autonomous vehicle 12 (FIG. 1) in an autonomous or semi-autonomous manner. In various embodiments, the data storage device 50 stores defined maps of the navigable environment. In various embodiments, the defined maps may be predefined by and obtained from the remote system 16 (FIG. 1). For example, the defined maps may be assembled by systems of the remote system 16 (FIG. 1) and communicated to the autonomous vehicle 12 (FIG. 1) (wirelessly and/or in a wired manner) and stored in the data storage device 50. As can be appreciated, the data storage device 50 may be part of the controller 44, separate from the controller 44, or part of the controller 44 and part of a separate system.

The communication system 52 is configured to wirelessly communicate information to and from the remote system 16 (FIG. 1) and/or other entities 54, such as but not limited to, other vehicles ("V2V" communication) infrastructure ("V2I" communication), remote systems, and/or personal devices. The information is provided to the controller 44 for use in autonomously or semi-autonomously controlling the autonomous vehicle 12 (FIG. 1). In an exemplary embodiment, the communication system 52 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference back to FIG. 1, in various embodiments, the vehicle operation compartment 26 is implemented as a separate and distinct compartment from the second compartment 28. In particular, the second compartment 28 is implemented such that certain internal environmental conditions of the second compartment can be maintained without interference from the vehicle operation compartment 26 (e.g., vapors, vibration, noise, etc.).

While the vehicle operation compartment 26 is depicted as being to one side of the second compartment 28, it is appreciated that the first compartment 26 may be alternatively implemented entirely below the second compartment 28, partially to one or more sides of and partially below the second compartment 28, so long as potential contaminants from the first compartment 26 are prevented from entering the second compartment 28.

The second compartment 28, hereinafter referred to the food management compartment 28, generally includes a sterile food management system 56. The sterile food management system 56 manages the storage, the preparation, and the delivery of food and/or drinks requested by a user. As will be realized by the detailed discussion below, the sterile food management system 56 manages the food and/or drink in a way that avoids contamination or spoiling of the food and/or drink by the environment and/or humans; the sterile food management system 56 manages the food and/or drink in a manner that avoid errors in preparation; and the sterile food management system 56 manages the food and/or drink in a manner that provides an improved quality of food at the time of delivery.

Figure 2B:
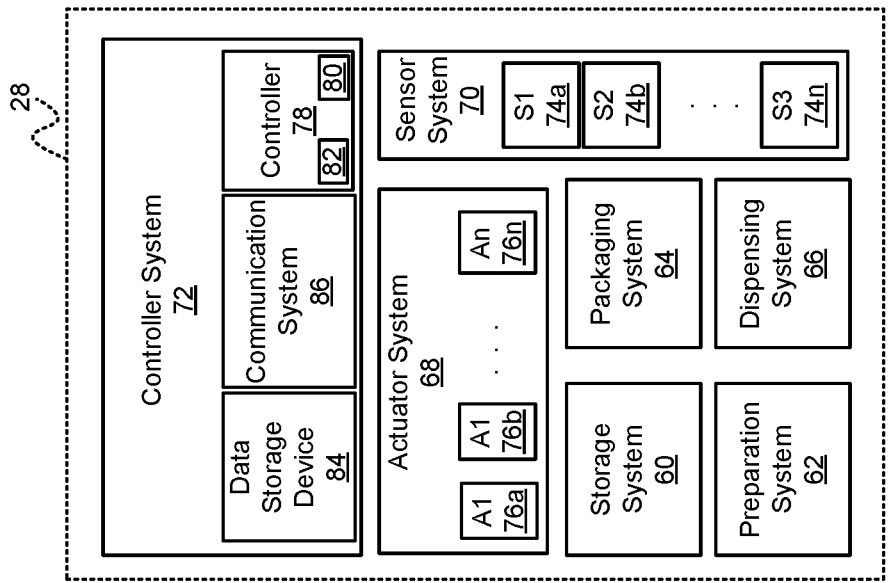
FIG. 2B is a functional block diagram of a sterile food management system of the autonomous vehicle in accordance with various embodiments.

Exemplary embodiments of the sterile food management system 56 are shown in more detail with regard to FIG. 2B through FIGS. 3-8. As shown in FIG. 2B, the sterile food management system 56 generally includes a storage system 60, a preparation system 62, a packaging system 64, a dispensing system 66, an actuator system 68, a sensor system 70, and a controller system 72.

The storage system 60 includes one or more storage compartments containing one or more receptacles for storing various ingredients, preparation materials, packaging materials, and disposable materials. For example, the receptacles can include, but are not limited to, bags, boxes, containers, pallets, pods, rolls, trays, and tubes. As can be appreciated, one or more of the ingredients and materials may be packaged (e.g., hermetic sealing, or other methods) in addition to being stored.

In various embodiments, the conditions (e.g., temperature, moisture level, pressure, light levels, etc.) of the storage compartments and/or the receptacles are controlled collectively or individually to maintain an overall quality of the food. In various embodiments, a collection of preservatives (e.g., lemon spray or other preservatives) may be controlled and applied to the materials to maintain an overall quality.

In various embodiments, the storage compartments can be arranged into a primary storage and auxiliary storage. The primary storage stores materials and/or ingredients that are ready to be used in preparation; and the auxiliary storage stores extra materials and/or ingredients that are delivered to the vehicle 12 (FIG. 1) and that may later be ready for use in preparation. In various embodiments, the primary storage may have associated storage conditions that are more sterile than the auxiliary storage, or vice versa.

The storage system 60 further includes one or more robots or task specific devices. The robots or task specific devices are actuated to insert ingredients or materials into the receptacles, remove ingredients from the receptacles, unpackage the ingredients or materials, and/or move ingredients or materials between the primary storage and the auxiliary storage.

The preparation system 62 includes one or more robots or task specific devices for food preparation such as, but not limited to, devices configured to chop, cube, dice, dip, dress, drizzle, emulsify, flip, foam, froth, grade, knead, mix, press, roll, rotisserie, spread, sprinkle, squeeze, turn, toss, whisk, etc. The preparation system 62 further includes one or more robots or task specific devices that are actuated to dispense via the methods described in paragraph insert ingredients or materials into the receptacles, remove ingredients from the receptacles, unpackage, or move ingredient on top of, into, or within a location specific to the preparation specifications.

The packaging system 64 includes one or more packaging devices such as, but not limited to, cones, cups, plates, pockets, or any other type of container defined as desirable as to preparation, presentation and preservation, which may also include hermetic sealing or use of thermal dividers as to segregate warm from cold. The packaging devices may further include devices applicable to certain weather and/or temperature conditions such as waterproof and/or thermal products.

The packaging system 64 further includes one or more robots or task specific devices that are actuated to package multiple different items culminating into a single delivered package. For example, combinations of different foods or drinks, cutlery, napkins, pamphlets may be packaged and then further packaged into a single delivery package.

The dispensing system 66 includes one or more robots and/or task specific devices configured to place the package within, on, or under, a target area, open a delivery window, maneuver a delivery tray, etc. In various embodiments, the dispensing system 66 may further include an aerial drone that picks up and completes the delivery to a target area. In various embodiments, a separate smaller drone ground based vehicle may complete the delivery to a target area. The dispensing system 66 may monitor regions of dispense for motion or thermal activity so as to avoid undesirable interaction or obstacles.

The sensor system 38 includes one or more sensing devices 74a-74n that sense observable conditions of the storage system 60, the preparation system 62, the packaging system 64, and the dispensing system 66. The sensing devices 74a-74n can include, but are not limited to, cameras or other image sensors (e.g., to confirm size, color, quality, etc. of materials, ingredients, environmental conditions, etc.), thermal sensors, pressure sensors, firmness sensors (e.g., strain gauge), scales to confirm weight, light spectrum sensors, radiation sensors, carbon monoxide or other element sensors, etc.

In various embodiments, one or more of the sensing devices 74a-74n are monitoring sensors that monitor a material or an ingredient in the storage system and generate signals indicative of an amount of the material or ingredient. In various embodiments, one or more of the sensing devices 74a-74n are monitoring sensors that monitor a material or an ingredient in the storage system and generate signals indicative of a content of the material or ingredient. In various embodiments, one or more of the sensing devices 74a-74n are monitoring sensors that monitor a prepared food or drink and generate signals indicative of a quality of the prepared food or drink. In various embodiments, one or more of the sensing devices 74a-74n are monitoring sensors that monitor a packaged food or drink and generate signals indicative of a quality of the packaged food or drink. In various embodiments, one or more of the sensing devices 74a-74n are environment monitoring sensors that monitor a condition of the environment of the storage system, the preparation system, and/or the dispensing system and generate signals indicative of a value of the condition.

The actuator system 68 includes one or more actuator devices 76a-76n that control one or more features or robots of the storage system 60, the preparation system 62, the packaging system 64, and the dispensing system 66.

Each of the systems 60-70 is autonomously managed and/or controlled by one or more controllers 78 of the controller system 72. For exemplary purposes, FIG. 2B illustrates a single controller 78 that is associated with all of the system 60-70. As can be appreciated the functions performed by the single controller 78 may be parsed into separate controllers (not shown) as needed in various embodiments.

The controller 78 includes at least one processor 80 and a computer readable storage device or media 82. The processor 80 can be any custom made or commercially available processor, a central processing unit (CPU), a graphics processing unit (GPU), an auxiliary processor among several processors associated with the controller 78, a semiconductor based microprocessor (in the form of a microchip or chip set), a macroprocessor, any combination thereof, or generally any device for executing instructions. The computer readable storage device or media 82 may include volatile and nonvolatile storage in read-only memory (ROM), random-access memory (RAM), and keep-alive memory (KAM), for example. The computer-readable storage device or media 48 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 78 in systems 60-68.

The instructions may include one or more separate programs, each of which comprises an ordered listing of executable instructions for implementing logical functions. The instructions, when executed by the processor 46, receive and process signals from the sensor system 70, perform logic, calculations, methods and/or algorithms for automatically controlling the components of the systems 60-68, and generate control signals to the actuator system 68 to automatically control the components of the systems 60-66 based on the logic, calculations, methods, and/or algorithms.

The controller system 72 may further include a data storage device 84 and/or a communication system 86. The data storage device 84 stores data for use in automatically controlling the systems 60-68 in an autonomous or semi-autonomous manner. In various embodiments, the data storage device 84 stores defined recipes for preparing food or a drink, and defined packing instructions for packaging food or a drink. For example, the instructions may be assembled by systems of the remote system 16 (FIG. 1) and communicated to the autonomous vehicle 12 (FIG. 1) (wirelessly and/or in a wired manner) and stored in the data storage device 84. As can be appreciated, the data storage device 84 may be part of the controller 78, separate from the controller 78 and communicatively coupled to the controller 78, or part of the controller 78 and part of a separate system.

The communication system 86 is configured to wirelessly communicate information to and from the remote system 16 (FIG. 1) and/or other entities 54, such as but not limited to, other vehicles ("V2V" communication) infrastructure ("V2I" communication), remote systems, and/or personal devices. The information is provided to the controller 78 for use in autonomously or semi-autonomously controlling the systems 60-68. In an exemplary embodiment, the communication system 86 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2A:
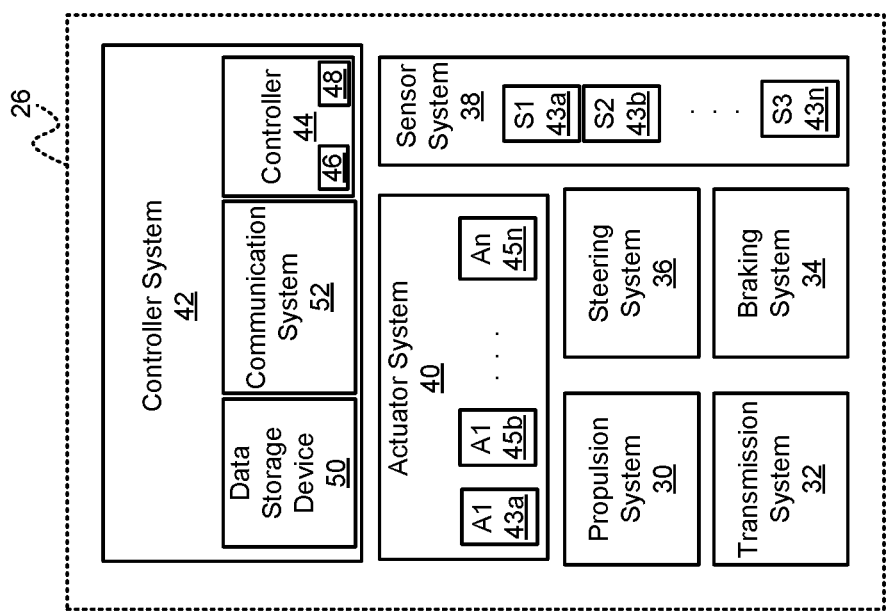
FIG. 2A is a functional block diagram of an autonomous vehicle system of the autonomous vehicle in accordance with various embodiments.
Figure 3:
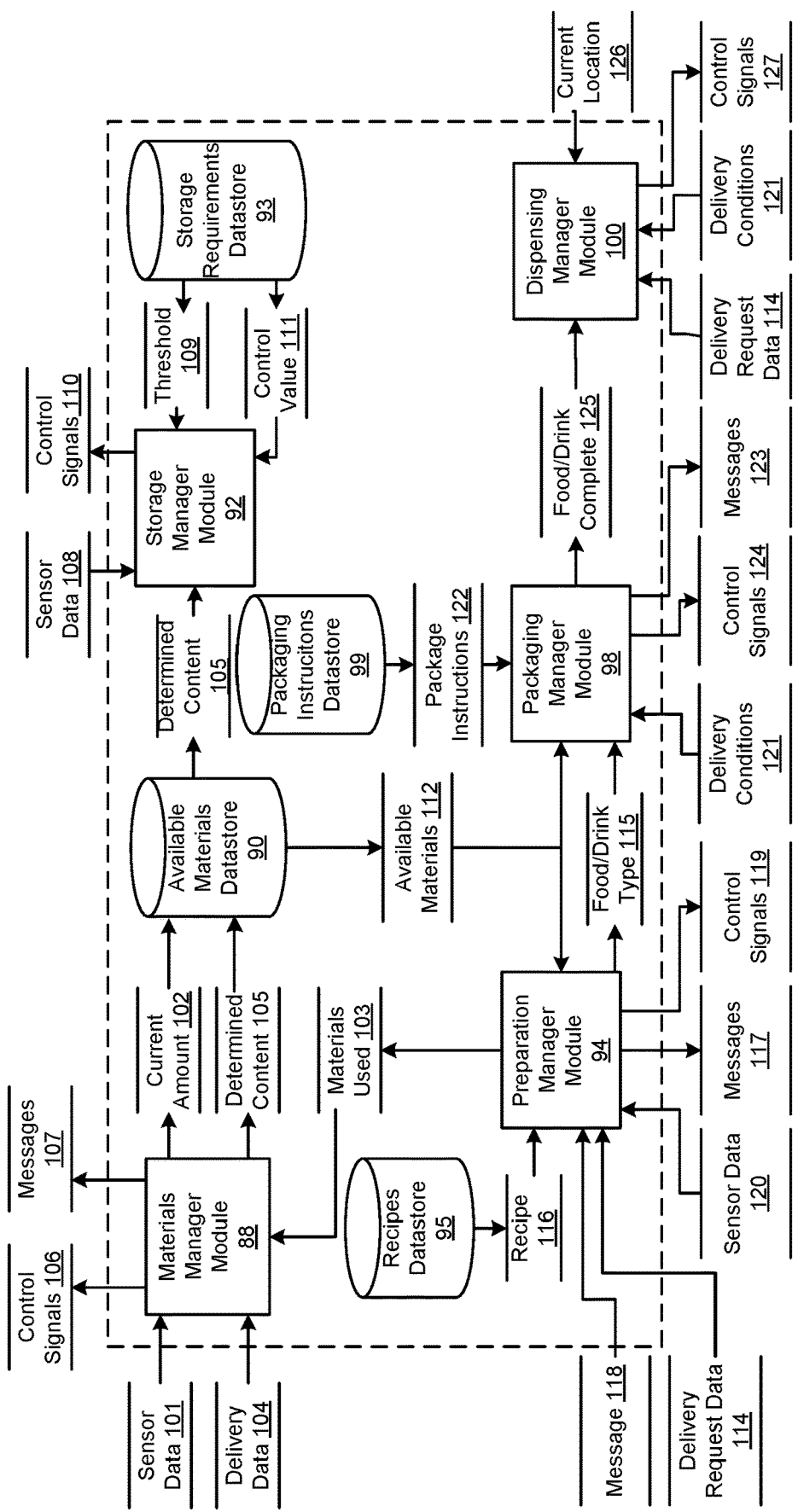
FIG. 3 is a dataflow diagram of a controller of the sterile food management system in accordance with various embodiments.

With reference to FIG. 3 and with continued reference to FIGS. 1, 2A, and 2B, a dataflow diagram illustrates various embodiments of the controller 78 in more detail. As can be appreciated, various embodiments of the controller 78 can include any number of sub-modules. The sub-modules shown in FIG. 3 may be combined and/or further partitioned to similarly manage the systems 60-68 of FIG. 2B. Inputs to the controller 78 may be received from the vehicle controller 44, the communication system 86, the sensing devices 74a-74n of the sensor system 70, and/or from other modules not explicitly shown in the controller 78. In various embodiments, the controller 78 includes a materials manager module 88, an available materials datastore 90, a storage manager module 92, a storage requirements datastore 93, a preparation manager module 94, a recipes datastore 95, a packaging manager module 98, a packaging instructions datastore 99, and dispensing manager module 100.

The materials manager module 88 automatically manages the content and the amount of the ingredients and/or materials (hereinafter generally referred to generally as "materials") stored by the storage system 60. The materials manager module 88 manages the materials based on sensor data 101 received from the monitoring sensors of the sensor system 70.

Figure 4:
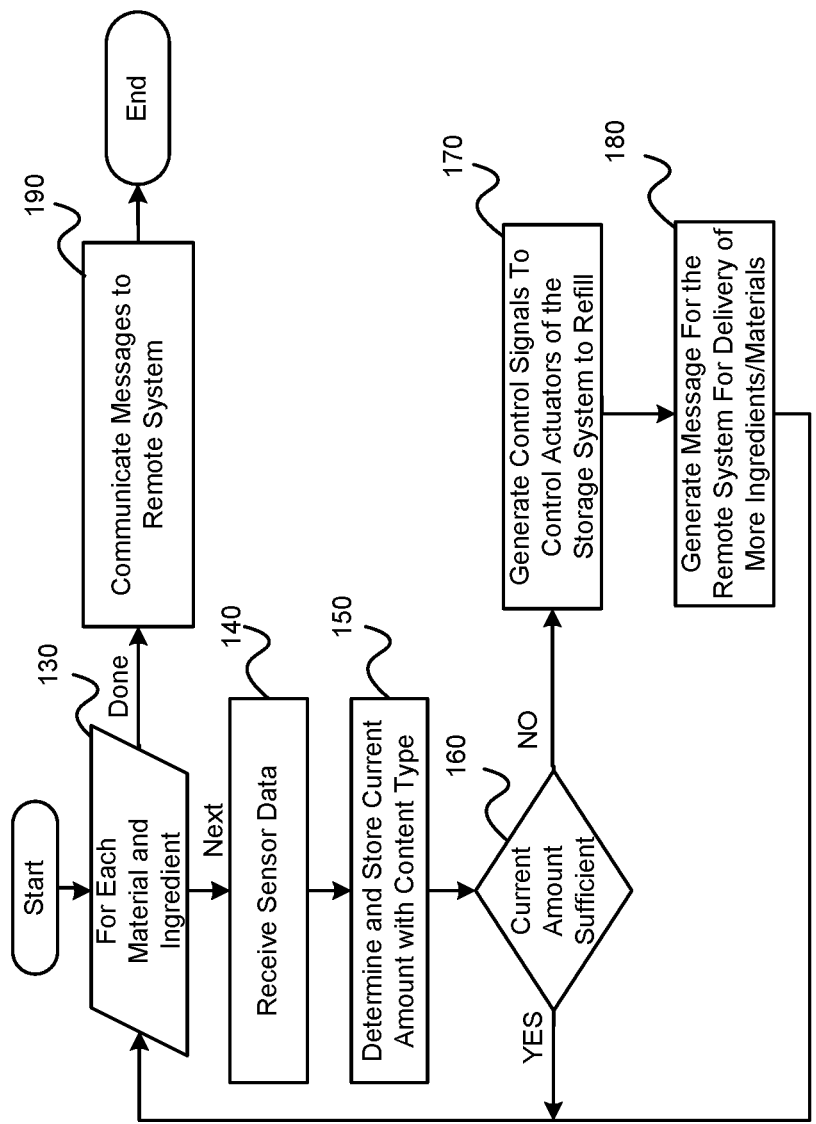
FIGS. 4-8 are flowcharts illustrating methods of the sterile food management system in accordance with various embodiments.

For example, as shown in an exemplary embodiment of FIG. 4 and with continued reference to FIG. 3, for each material at 130, the materials manager module 88 receives data from the sensor of the sensor system 70 that monitor the content and/or amount of the stored materials at 140. Based on the sensor data 101, the materials manager module 88 determines a current amount 102 of the material at 150. In various embodiments, the determined amount 102 can be confirmed by the materials manager module 88 by, for example, a comparison to an estimated amount that is based on in-vehicle materials used data 103 and delivery data 104 indicating an amount delivered to the vehicle 12. When the determined amount is largely different than the estimated amount (due to sensor failures or inaccuracies in the sensor signals), then the estimated amount is used as the current amount 102. The current amount 102 (whether it be the determined amount or the estimated amount) is stored in the available materials datastore 90 along with a content type 105.

Thereafter, the materials manager module 88 determines if the current amount 102 is sufficient at 160. For example, in various embodiments, the materials manager module 88 determines if the current amount 102 is sufficient by comparison to a predefined requirement (e.g., established by the remote system 16 or other coordinator of the system 14). In another example, in various embodiments, the materials manager module 88 determines if the current amount 102 is sufficient by comparison to a requirement that is determined based on future need (e.g., that is computed based on upcoming delivery requests).

When the materials manager module 88 determines that the current amount 102 of the materials is not sufficient at 160, the materials manager module 88 generates control signals 106 to one or more actuator devices of the actuator system 68 to cause a desired amount to be refilled in the primary storage from the auxiliary storage at 170; and/or generates messages 107 that are communicated to the remote system 16 to coordinate delivery of additional materials to the storage system 60 at 180. As can be appreciated, the messages 107 communicated to the remote system 16 can be sent once, after all materials have been monitored at 130, or as each material is monitored (not shown). As shown, once monitoring of each the materials and/or ingredients is complete at 110, the messages 107 are communicated at 190.

Figure 5:
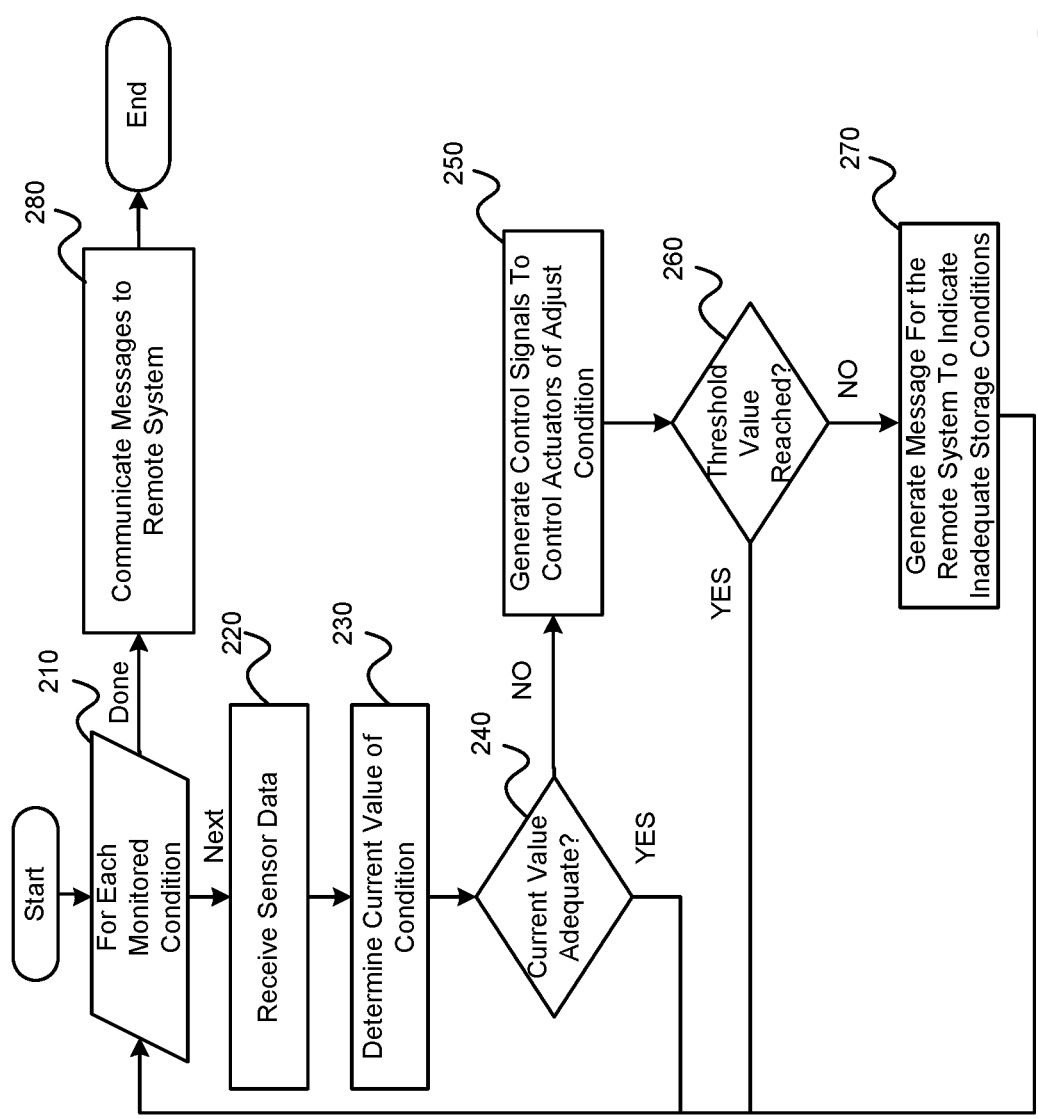

With particular reference back to FIG. 2, the storage manager module 92 manages storage conditions associated with the storage system 60. The conditions may include, but are not limited to, an ambient air temperature, a level of moisture in the air, an amount of light in the compartment, an air pressure, vibrations within the compartment, air quality, and a temperature of the food. For example, in various embodiments as shown in FIG. 5 and with continued reference to FIGS. 1, 2A, 2B, and 3, for each monitored condition at 210, the storage manager module 92 receives sensor data 108 indicating a measured value associated with the condition of the storage system 60 at 220. The storage manager module 92 processes the sensor data 108 to determine a current value of the condition at 230. The storage manager module 92 then determines if the current value of the condition is adequate at 240. For example, the storage manager module 92 retrieves from the storage requirements datastore 93 a threshold value 109 for the condition and compares the current value to the threshold value 109. Based on the comparison, the storage manager module 92 determines whether the condition is adequate or needs adjusting. When it is determined that that the condition is not adequate (i.e., needs adjusting), the storage manager module 92 generates control signals 110 to one or more of the actuators of the actuator system 68 such that the condition is adjusted to a desired value. In various embodiments, the control signal 110 is generated based on a predetermined control value 111 associated with the threshold value 109 that is retrieved from the storage requirements datastore 93 or is determined by the storage manager module 92 based on a difference between the current value and the threshold value 109. The threshold value 109 can be, in various embodiments, selectable based on an operation region, for example, such they take into consideration environmental conditions such as temperature, altitude, etc.

Figure 6:
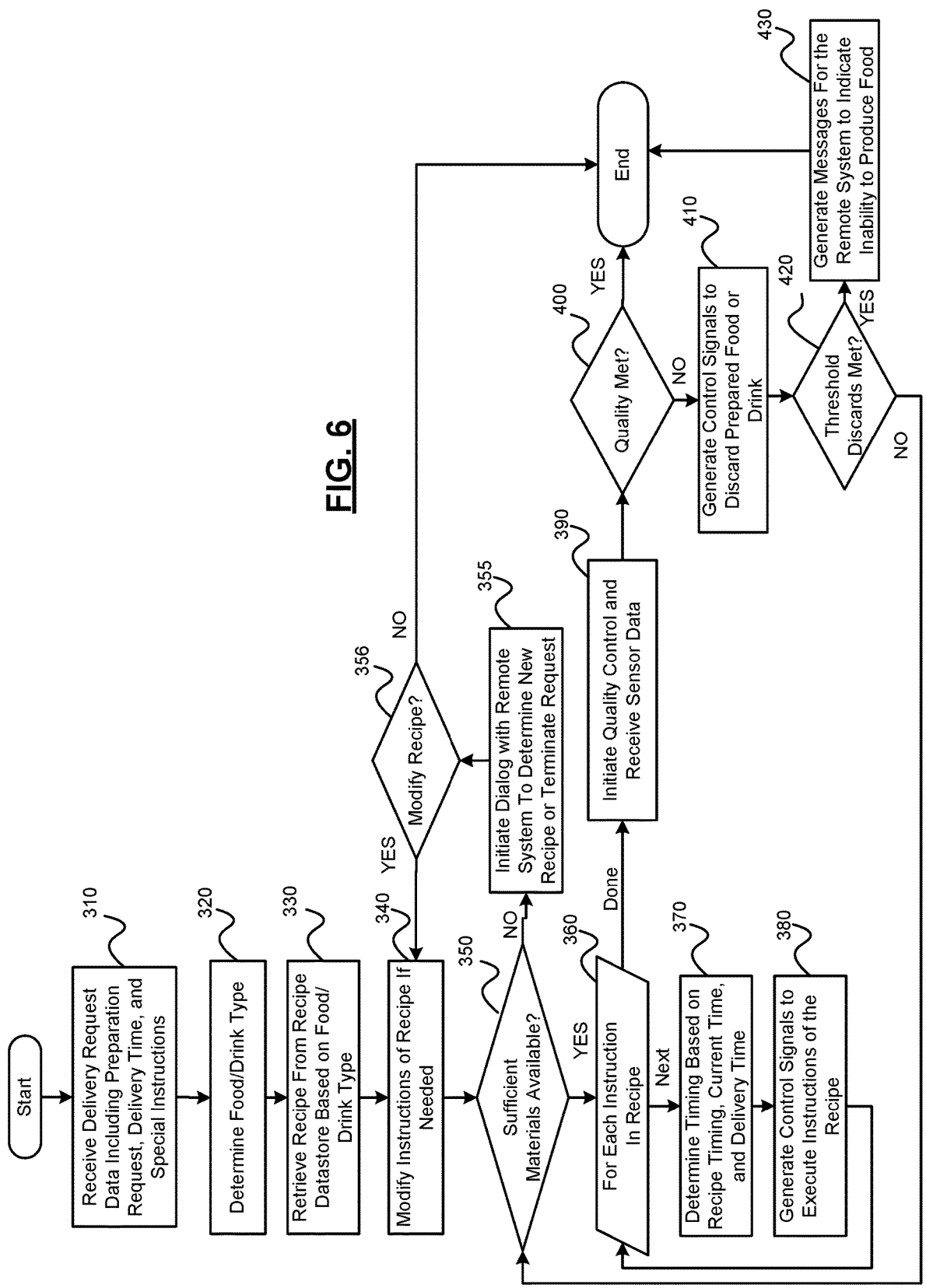

With particular reference back to FIG. 3, the preparation manager module 94 manages the preparation of a requested food/drink based on the available ingredients and materials as indicated by the data 112 in the available materials datastore 90, and the timing and/or special instructions indicated by delivery request data 114. For example, as shown in more detail with regard to FIG. 6 and with continued reference to FIGS. 1, 2A, 2B, and 3, the preparation manager module 94 receives the delivery request data 114 indicating the preparation request, the delivery timing data, and special instructions data (if provided) at 310. The preparation manager module 94 evaluates the preparation request to determine the food or drink type 115 to be prepared at 320. The preparation manager module 94 then retrieves a recipe 116 from the recipes datastore 95 that corresponds to the type of food or drink 115 to be prepared. The preparation manager module 94 then evaluates the special instructions, if provided, and selectively modifies the recipe 116 if needed at 340. For example, if the special instructions include "extra pickles," "no sugar", etc., then the instruction corresponding to the "pickles" or "sugar" is modified using defined values associated with the terms "extra" (add 2) or "no" (zero).

The preparation manager module 94 then determines from the recipe 116 (modified or unmodified) the needed materials. The preparation manager module 94 evaluates the stored data indicating the available materials 112 in the available materials datastore 90 to determine if sufficient materials are present in the storage system 60 at 350. If the preparation manager module 94 determines that sufficient materials are not available at 350, messages 117 are generated to the remote system 16 to initiate a dialog with the remote system 16 to determine a new recipe, or to navigate the vehicle to a location to pick-up more materials, or if the request should be terminated at 355. If it is communicated by the remote system 16 that the recipe 116 can be modified to be the new recipe or new materials can be picked up in time at 356, then the instructions of the recipe 116 are modified at 340 (e.g., to include new ingredients, to account for a time delay for pick-up, etc.) as indicated by instructions from the remote system 16 and the preparation manager module 94 continues at 350.

If, at 350, sufficient materials are present, the preparation manager module 94 then generates control signals 119 according to the instructions of the recipe 116. For example, for each instruction of the recipe 116 at 260, a timing of performing the instruction is determined based on a current time, a timing indicated by the recipe 116, and the delivery time at 370. When the current time is the right time, the preparation manager module 94 generates control signals 119 that cause the actuator devices of the actuator system 68 to obtain the materials and perform the functions necessary to prepare the food or drink at 380. The preparation manager module 94 iterates through steps 360-380 until all of the instructions of the recipe 116 have been performed at 360.

Once all of the instructions of the recipe 116 have been performed at 360, the preparation manager module 94 initiates quality control by requesting and receiving sensor data 120 from the quality monitoring sensors of the sensor system 70, and processing the received sensor data 120 to determine an overall quality at 390. If the overall quality has not been met at 400, the preparation manager module 94 generates control signals 119 to cause one or more of the actuator devices of the actuator system 68 to cause the preparation system 62 to discard the prepared food or drink at 410. If the number of discards does not exceed a threshold (e.g., three attempts, or other number) the preparation manager module 94 begins again with the preparation at 350. As can be appreciated, after so many iterations (above the threshold) of discarding a prepared food or drink due to lack of quality at, a message 117 can be generated and communicated to the remote system 16 to notify the remote system 16 that the request cannot be completed at 420.

Figure 7:
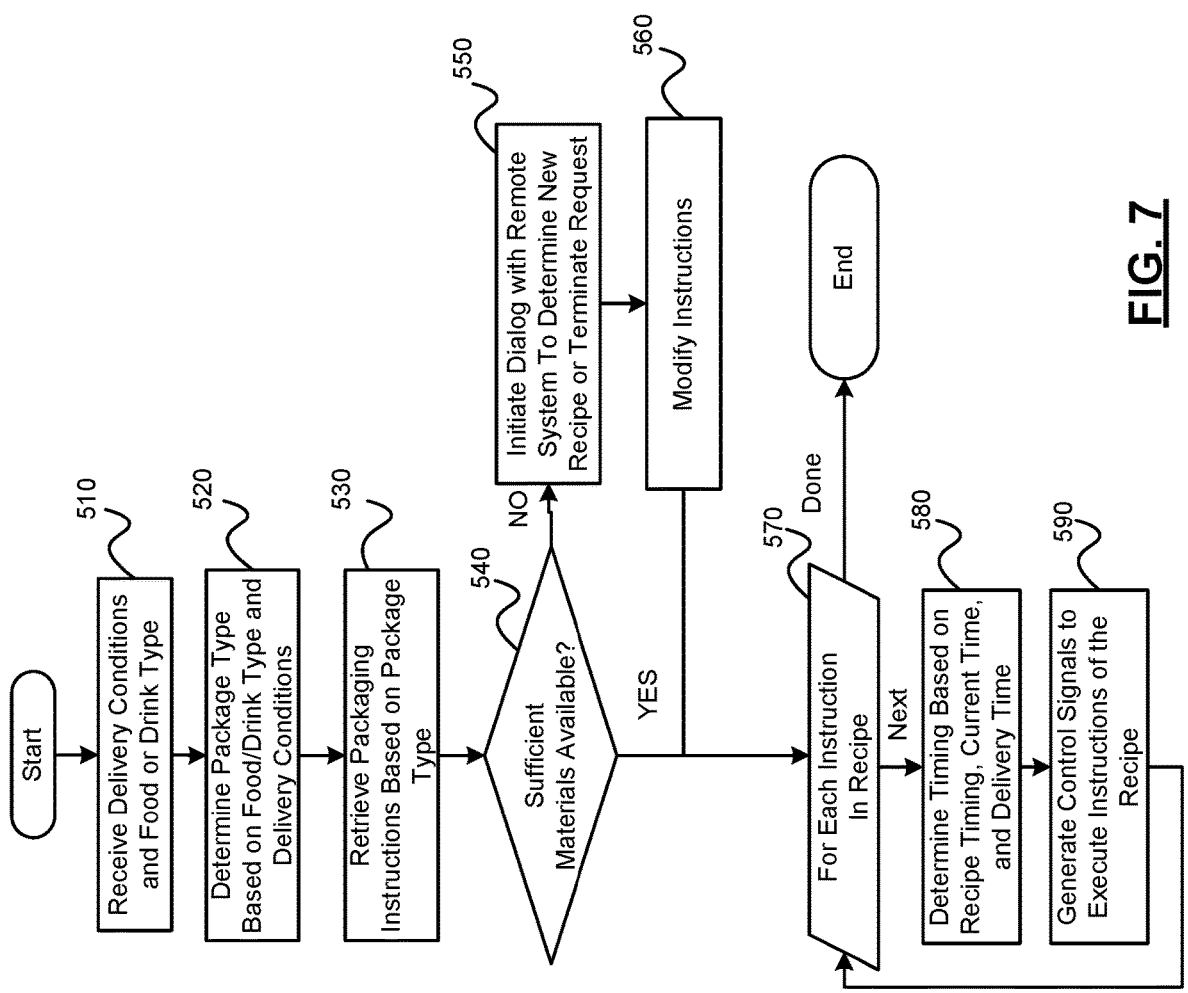
Figure 8:
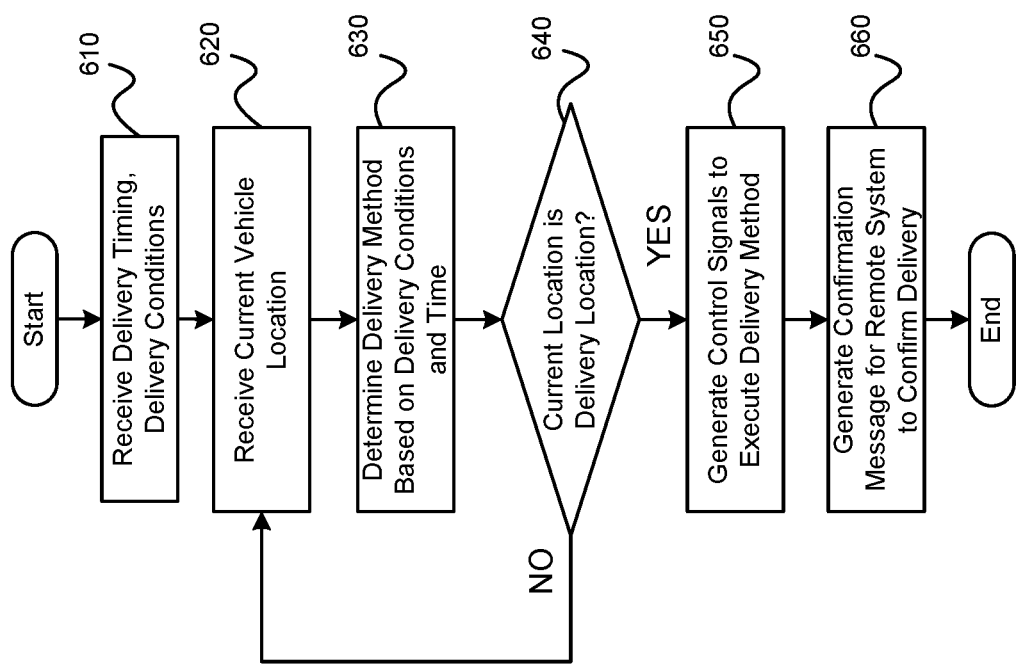

The packaging manager module 98 manages the packaging of the prepared food or drink based on the available materials 112 as indicated by the available materials datastore 90, the food or drink type 115 as indicated by the preparation manager module 94, and predicted delivery conditions 121. The predicted delivery conditions 121 data can include weather conditions, drop-off conditions, drop-off methods (e.g., drone, delivery window, etc.), etc. The delivery conditions 121 can be received from the remote system 16 and/or the controller system 72. For example, as shown in more detail with regard to FIG. 7 and with continued reference to FIGS. 1, 2A, 2B, and 3, the packaging manager module 98 receives the delivery conditions 121 and the determined food or drink type 115 at 510. The packaging manager module 96 evaluates the delivery conditions 121 and the determined food or drink type 115 to determine a package type to use in packaging the prepared food or drink at 520. For example, if the food type is hot coffee, and the delivery conditions is raining, then the package type may be an insulated package so that the beverage remains hot and exposure to the rain.

The packaging manager module 98 then retrieves defined packaging instructions 122 from the packaging instructions datastore 99 that corresponds to the type of package to be used. The packaging manager module 98 then determines from the packaging instructions 122 the needed materials. The packaging manager module 98 evaluates the stored data indicating the available materials 112 in the available materials datastore 90 to determine if sufficient materials are present in the storage system 60 at 540. If the packaging manager module 98 determines that the sufficient materials are not available at 540, messages 123 are generated to the remote system 16 to initiate a dialog with the remote system 16 to determine new packaging instructions (or an alternate is selected from the packaging instructions datastore 99 without remote assistance) at 550. The packaging instructions 122 are updated at 560 to either include instructions indicated by the remote system 16 or to include chosen alternate packaging instructions 122 at 560.

At 570, for each instruction, a timing of performing the instruction is determined based on a current time, a timing indicated by the packaging instructions, and the delivery time at 580. When the current time is the right time, the packaging manager module 98 generates control signals 124 that cause the actuator devices of the actuator system 68 to cause the packaging system 64 to obtain the materials and perform the functions necessary to package the food or drink at 590. The packaging manager module 98 iterates through steps 360-380 until all of the instructions 122 have been performed at 570.

Once all of the instructions have been performed at 570, the packaging manager module 98 may, in various embodiments, initiate quality control as discussed with regard steps 390-420 performed by preparation manager module 94, or alternatively may assume the quality of the packaging is acceptable.

With reference back to FIG. 3, when the food or drink preparation is complete as indicated by a completion flag 125 the dispensing manager module 100 manages the dispensing of the packaged food to an individual or a location based on a delivery time indicated by the delivery request data 114, the predicted delivery conditions 121, and a current location 126 of the vehicle 12. For example, as shown in more detail with regard to FIG. 8 and with continued reference to FIGS. 1, 2A, 2B, and 3, the dispensing manager module 100 receives the delivery conditions data 121 and the delivery time data (e.g., as indicated by the delivery request data 114) at 610. The dispensing manager module 100 further receives the current vehicle location data 126, for example, from the vehicle control system at 620. The dispensing manager module 100 determines a dispensing method based on the delivery conditions and the delivery time at 630.

If the current location 126 is the delivery location at 640, the dispensing manager module 100 generates control signals 123 to cause one or more of the actuator devices of the actuator system 68 to cause the dispensing system 66 to dispense or deliver the packaged food or drink to the user or at the location at 650. Thereafter, a confirmation message may optionally be generated to the remote system 16 to confirm delivery of the prepared and packaged food or drink at 660.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of delivering food, comprising:
providing an autonomous vehicle having a vehicle operation compartment, a food management compartment, a controller, a data storage device; the food management compartment having a storage system, a preparation system, and a packaging system, and a quality monitoring sensor disposed therein;
storing first and second individual ingredients in the storage system;
controlling, by the controller, at least one internal condition of the storage system;
receiving, by the contoller, a delivery request;
retrieving, by the controller, a recipe that is stored in the data storage device based on the delivery request;
retrieving, by a first device in the storage system, the first and second individual ingredients, based on the recipe;
autonomously performing at least one food preparation task on the first and second individual ingredients, by the preparation system, using the recipe to obtain prepared food;
receiving, by the controller, quality sensor data from the quality monitoring sensor in the food management compartment indicating a quality of the prepared food;
packaging, by a second device in the packaging system in the food management compartment, the prepared food in a packaging device to obtain packaged food when the quality sensor data indicates an overall quality of the prepared food has been met; and
autonomously delivering the packaged food by the autonomous vehicle to a delivery location indicated in delivery request.

2. The method of claim 1, further comprising:
discarding the prepared food, by the preparation system, when the quality sensor data indicates the overall quality of the prepared food has not been met.

3. The method of claim 1, wherein the quality monitoring sensor is a camera.

4. The method of claim 1, wherein the food management compartment includes a dispensing system, the method further comprising:
dispensing the packaged food, by a third device in the dispensing system, to an individual.

5. The method of claim 1, wherein the food management compartment includes a dispensing system, the method further comprising:
- placing the packaged food, by a third device in the dispensing system, within a target area after the autonomous vehicle reaches the delivery location.

6. The method of claim 5, wherein the third device is an aerial drone, and the target area is external of the autonomous vehicle.

7. The method of claim 5, wherein the target area is proximate to a delivery window of the autonomous vehicle.

8. An autonomous vehicle, comprising:
- a vehicle operation compartment, a food management compartment, a controller, a data storage device;
- the food management compartment having a storage system, a preparation system, a packaging system, and a quality monitoring sensor disposed therein;
- the storage system storing first and second individual ingredients;
- the controller controlling at least one internal condition of the storage system;
- the controller receiving a delivery request;
- the controller retrieving a recipe that is stored in the data storage device based on the delivery request;
- a first device in the storage system retrieving the first and second individual ingredients, based on the recipe;
- the preparation system autonomously performing at least one food preparation task on the first and second individual ingredients using the recipe to obtain prepared food;
- the controller receiving quality sensor data from the quality monitoring sensor in the food management compartment indicating a quality of the prepared food;
- a second device in the packaging system in the food management compartment packaging the prepared food in a packaging device to obtain packaged food when the quality sensor data indicates an overall quality of the prepared food has been met; and
- the autonomous vehicle autonomously delivering the packaged food by to a delivery location indicated in the delivery request.

9. The autonomous vehicle of claim 8, wherein:
- the preparation system discarding the prepared food when the quality sensor data indicates the overall quality of the prepared food has not been met.

10. The autonomous vehicle of claim 8, wherein the quality monitoring sensor is a camera.

11. The autonomous vehicle of claim 8, wherein the food management compartment further includes a dispensing system, and a third device in the dispensing system dispensing the packaged food to an individual.

12. The autonomous vehicle of claim 8, wherein the food management compartment includes a dispensing system, and a third device in the dispensing system placing the packaged food within a target area after the autonomous vehicle reaches the delivery location.

13. The autonomous vehicle of claim 12, wherein the third device is an aerial drone, and the target area is external of the autonomous vehicle.

14. The autonomous vehicle of claim 12, wherein the target area is proximate to a delivery window of the autonomous vehicle.

* * * * *